US009525967B2

(12) United States Patent
Mamlyuk

(10) Patent No.: US 9,525,967 B2
(45) Date of Patent: Dec. 20, 2016

(54) SYSTEM AND METHOD FOR GPS-BASED REPORT GENERATION

(71) Applicant: Boris N. Mamlyuk, Memphis, TN (US)

(72) Inventor: Boris N. Mamlyuk, Memphis, TN (US)

( * ) Notice: Subject to any disclaimer, the term of this patent is extended or adjusted under 35 U.S.C. 154(b) by 0 days.

(21) Appl. No.: 14/340,810

(22) Filed: Jul. 25, 2014

(65) Prior Publication Data

US 2015/0031343 A1    Jan. 29, 2015

Related U.S. Application Data

(60) Provisional application No. 61/859,190, filed on Jul. 27, 2013.

(51) Int. Cl.
*H04W 4/02* (2009.01)
*B29B 17/00* (2006.01)

(52) U.S. Cl.
CPC ........ *H04W 4/02* (2013.01); *B29B 2017/0089* (2013.01); *B29B 2017/0094* (2013.01)

(58) Field of Classification Search
None
See application file for complete search history.

(56) References Cited

U.S. PATENT DOCUMENTS

| 8,473,509 | B2 * | 6/2013 | Kavitha | G06F 17/30241 |
| | | | | 707/769 |
| 9,108,797 | B1 * | 8/2015 | Borges | G06Q 10/30 |
| 2002/0069137 | A1 * | 6/2002 | Hiroshige | G06Q 10/08 |
| | | | | 705/308 |
| 2004/0143355 | A1 * | 7/2004 | Uetake | G06Q 10/00 |
| | | | | 700/116 |
| 2007/0174073 | A1 * | 7/2007 | Hunscher | G06Q 10/30 |
| | | | | 705/39 |
| 2012/0209783 | A1 * | 8/2012 | Smith, Jr. | G06Q 30/02 |
| | | | | 705/308 |
| 2012/0322401 | A1 * | 12/2012 | Collins | H04W 4/22 |
| | | | | 455/404.1 |
| 2015/0134697 | A1 * | 5/2015 | Kavitha | H04W 4/02 |
| | | | | 707/769 |
| 2015/0235184 | A1 * | 8/2015 | Hunscher | G06Q 20/34 |
| | | | | 705/308 |

* cited by examiner

*Primary Examiner* — Hilina K Demeter
(74) *Attorney, Agent, or Firm* — Wayne Edward Ramage; Baker Donelson

(57) ABSTRACT

A system for the global generation, maintenance and distribution of reports of certain conditions in identified locations. The system generates and/or receives reports through an observer's mobile computing device (e.g., cell phone, smart phone, tablet computing device, or wearable computing device) equipped with a GPS receiver and system to ascertain the device's location, and with a camera or video camera to take an image or video of the condition that is being reported. The observer or other user can annotate a location on a computer-based map or mapping system, or otherwise edit information on such a map.

17 Claims, 3 Drawing Sheets

SYSTEM AND METHOD FOR GPS-BASED REPORT GENERATION

This application claims benefit of and priority to U.S. Provisional Application No. 61/859,190, filed Jul. 27, 2013, by Boris N. Mamlyuk, and is entitled to that filing date for priority. The specification, figures and complete disclosure of U.S. Provisional Application No. 61/859,190 are incorporated herein by specific reference for all purposes.

FIELD OF INVENTION

This invention relates to a system and method for reporting and collecting information regarding conditions in specified locations. More particularly, this invention relates to a system and method for reporting and collecting information regarding conditions in specified locations through a mobile computing device equipped with a Global Positioning System (GPS).

BACKGROUND OF INVENTION

The collection and transportation of trash and recyclables from residential, commercial, industrial and large residential facilities is a major industry in the United States and throughout the civilized world. Typically, trash and recyclables are accumulated and temporarily stored in waste material receptacles such as trash cans and dumpsters. When filled, or at regularly scheduled intervals, trash and recyclables from the containers are transported for the eventual recycling, incineration and/or disposal into landfills.

Customers typically pay for trash and recyclables removal services based on the amount of trash and recyclables removed and the number of trash and recyclables pickups over a period of time. These industrial, commercial and large residential bins and compactors are collected from different locations and hauled to a central location. Normally, those hauling the trash and recyclables are sent from a central location and dispatched to the different locations. In practice, paper logs or schedules document the hauler's runs (e.g., trash and recyclables to pick-up, trash and recyclables being picked-up, and trash and recyclables picked-up). The haulers are given their routes in person or over the phone. The haulers, in turn, keep in touch with the central location generally by cell phone or radio.

Multiplied globally, significant time is wasted on maintenance and repair of equipment from inefficient removal chains, or removal processes. It takes significant staffing support to monitor distribution of work orders to removal sites. Time and energy are expended in inefficient responses. Methods and systems for improving the collection of waste and refuse are disclosed in U.S. Pat. No. 8,185,277, and U.S. Patent Application Publication Nos. 20080197194, 20080198021, and 20080202357, all of which are incorporated herein by specific reference for all purposes.

There are a number of existing systems known in the art that allow users to submit reports on locations of trash and nuisance conditions. However, these systems are limited to certain specific jurisdictions (e.g., a particular municipality, city, or park). Such systems also are limited in scope and utility, and provide little or no incentive for generating or responding to reports.

SUMMARY OF INVENTION

In various embodiments, the present invention comprises a system and associated methods for the global generation, maintenance and distribution of reports of certain conditions in identified locations. In several embodiments, the system generates and/or receives reports through an observer's mobile computing device (e.g., cell phone, smart phone, tablet computing device, wearable computing device such as Google Glass, or the like) equipped with a GPS receiver and system to ascertain the device's location, and with a camera or video camera to take an image or video of the condition that is being reported. In several embodiments, the observer or other user can annotate a location on a computer-based map or mapping system, or otherwise edit information on such a map.

In an exemplary embodiment, the invention comprises a system and apparatus for receiving waste or condition metadata information to be associated with a geographic location. The information may be real-time reports, and include a photo of the waste or condition, the GPS coordinates of the photo of the waste or condition, a timestamp, and information related to the identity of the reporting user or observer. This information is sent to and stored in a database in association with the location, and in association with the user.

The report or reports may be analyzed by image optimization and image recognition software algorithms. Imagery analysis allows automatic recognition of objects as known or unknown to the database, followed by known categories being recognized. Synchronous imagery analysis results in robust real-time mapping of trash or conditions (removal chain). This allows tracing of waste or conditions based on origin. Understanding the provenance of waste or conditions may allow for legal tracing of liability, enforcement of which could constitute an additional source of income.

The system may be used for reporting the need for trash removal. Monitoring fair and accurate charges for trash removal on the basis of trash volume versus regularity of pickups allows for significant cost savings to consumers and potential incentive to reduce the environmental footprint. The cost savings (and corollary cost increase for higher number of responses) is an incentive to not report false positive waste reports.

The report data is sent to the appropriate entity responsible for the waste removal ("responder"). Responders include private landowners, commercial landowners or business (e.g., malls, factories), governmental agencies or entities, hospitals, waste management companies, educational institutions, and the like. Real time report data and transmission to responders eliminates or reduce trash overages, under size containers, and poor container maintenance conditions (e.g., no lid). Permits/citations/fees/sanctions will force compliance. Users can specify correct container size, and schedule additional pick-ups. Service may be halted due to lack of payment or by schedule.

Information regarding each user, the account associated therewith, and the responder in a reporting user's given roaming location (anywhere globally) is stored on a managed database. The database may include other information such as responder or hauler name, unique identifier number, expiration date (a date beyond which responder may not be able to respond), and so forth.

Understanding the nature, origin, and dynamics of waste diffusion from particular sources (i.e., consumer goods manufacturers selling goods in non-compostable packaging) can be financially significant. Empirically robust market data on the environmental impact of their consumer goods (e.g., Pepsi bottles; Starbucks cups) can be sold to businesses. Visualization on a real-time global scale also opens new forms of consumer advocacy. The integration of social media processes allows for game-ification (e.g., points for submitting litter reports, points for cleanup), and financial incentivization (e.g., coupons for Pepsi for ten reports of Pepsi bottles). Tracing of user reports back to the user's mobile device radically decreases likelihood of false reports, as the reporting user's "credibility" ranking can also be lowered or otherwise adjusted based on the accuracy and quality of reports.

The system also allows the building of superior datasets. Superior datasets are valuable to all landowners, and are ultimately valuable to consumers. Ranking countries, states, cities, neighborhoods, businesses, and campuses (public and private) by effectiveness of clean-ups and conditions (and, by implication, cleanliness/desirability of neighborhood or property) can be a significant source of revenue for a ratings agency or the landowner.

In yet another embodiment, the system may be used by property owners or operators to maintain clean and safe environments and locations. From the standpoint of competitive advantage as well as the reduction of liability, commercial, industrial and large residential (e.g., condos and apartment buildings) property owners desire to offer their customers and employees a clean and safe environment. Such businesses or owners can subscribe to receive real-time waste reports to ensure near-real-time responsiveness to waste or condition issues in a given area or microjurisdiction (i.e., spilled milk in grocery store; soggy stair at a mall).

In a further embodiment, the invention comprises the transmission of data to parties responsible for waste removal in a given jurisdiction or condition rectification (e.g., a property owner or operator) in real-time. Thus, for example, a business owner who subscribes to the service can be notified of a dangerous condition, such as a liquid spill, immediately following submission of report by a customer observing and reporting the condition. Or the existence of waste or refuse can be reported to the appropriate municipal waste management companies, private waste removal companies, individual responders, or operators of waste and refuse removing and hauling vehicles (i.e., vehicles having an on-board communication system for controlling, tracking, and monitoring movement of a waste or refuse receptacle relative to the vehicle). Waste haulers specializing in recyclable materials may subscribe to real-time report databases of valuable units of recyclable material, or accumulated volume triggered reports. Subscription access to a real-time robust, ongoing global database of litter reports represents a source of income.

An embodiment of the present invention comprises many user-generated map layers, including responding party information in a particular municipality or location. Partial population of the data fields and continued integrity of the datasets from user input in native languages represents a robust global database of municipal-citizen (university-student; company-employee) civic interactions. This may include frequency of reports in a given jurisdiction, responsiveness of a particular responding agency (or firm) within that jurisdiction, and access to datasets containing contact information for responding agencies (i.e., for marketing purposes). Beyond litter reports, responsiveness to citizen complaints/reports can be correlated to a responder's general measure of good/bad will or resource allocation for civic maintenance. Restricted access to user rates, user identification/demographic information, and other metrics/indicia of user activity within a given jurisdiction on an exceptional fee or subscription basis can be an additional source of revenue generation.

In yet another embodiment, the system can be used for recyclable content. Each moment, citizens dispose of millions of tons of valuable recyclable post-consumer content. In instances, this may include precious metals (such as the disposal of batteries, electronics, and other materials). An embodiment of the present invention provides a method and system for managing data relating to recyclable materials by providing a database system comprising an input for receiving information from reporters, said information comprising sets of source identifications (analyzed photo of waste item) and associated recycled quantities. A related embodiment of the present invention includes a transmission algorithm allowing tracing of reports from the database to likely buyers of "recyclable waste" reports (i.e., firms that specialize in lead acid battery removal; metals).

DETAILED DESCRIPTION OF EXEMPLARY EMBODIMENTS

Figure 1:
FIG. 1 shows views of an application program in accordance with an embodiment of the present invention in use on a tablet computing device and a smart phone.

The present invention comprises a system and associated methods for the global generation, maintenance and distribution of reports of certain conditions in identified locations. In several embodiments, the system generates and/or receives reports through an observer's mobile computing device (e.g., cell phone, smart phone, tablet computing device, wearable computing device such as Google Glass, or the like) equipped with a GPS receiver and system to ascertain the device's location, and with a camera or video camera to take an image or video of the condition that is being reported. FIG. 1 shows an example of the application in use on a tablet computing device 10 and a smart phone 12. In several embodiments, the observer or other user can annotate a location on a computer-based map or mapping system, or otherwise edit information on such a map.

Figure 2:
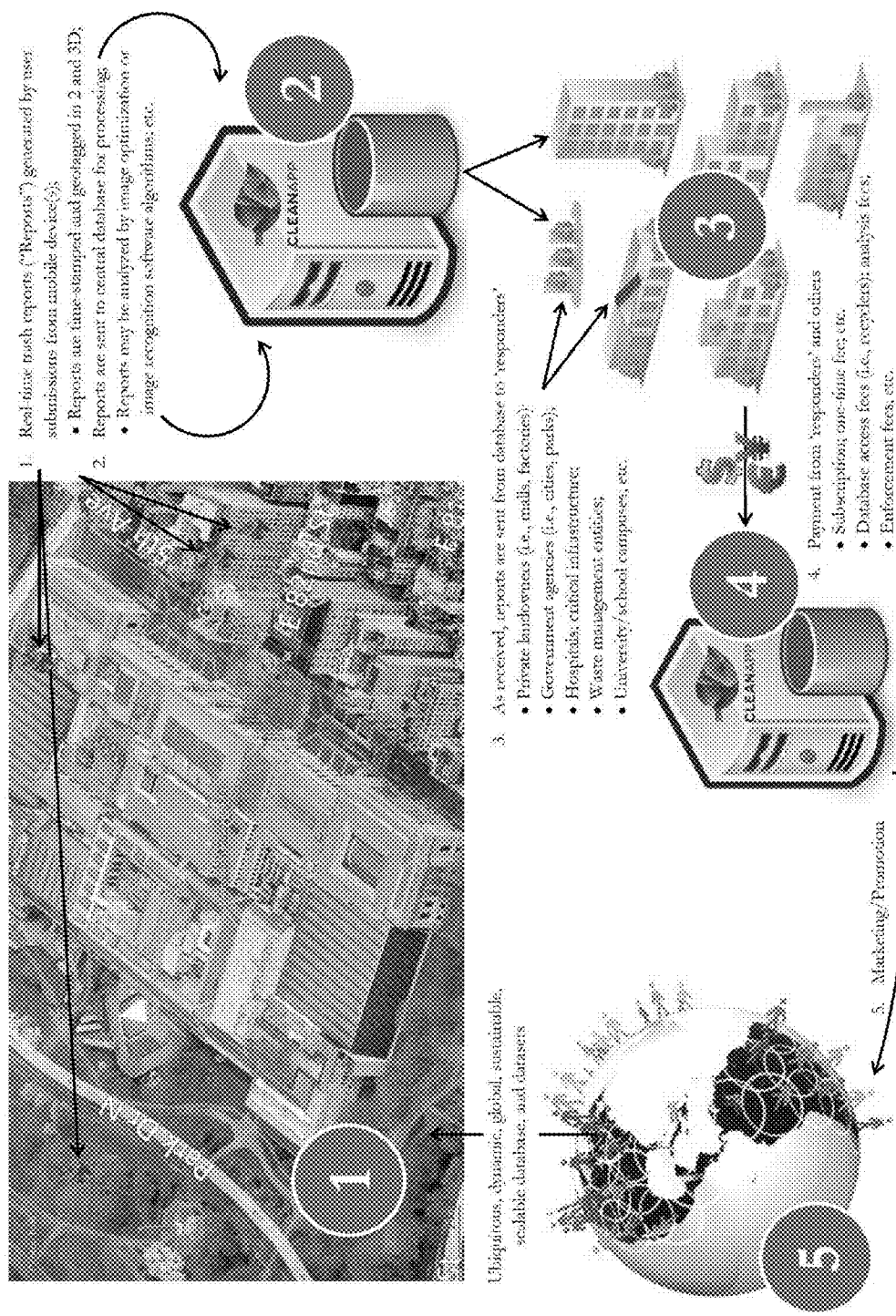
FIG. 2 shows a diagram of a system in accordance with an embodiment of the present invention.
Figure 3:
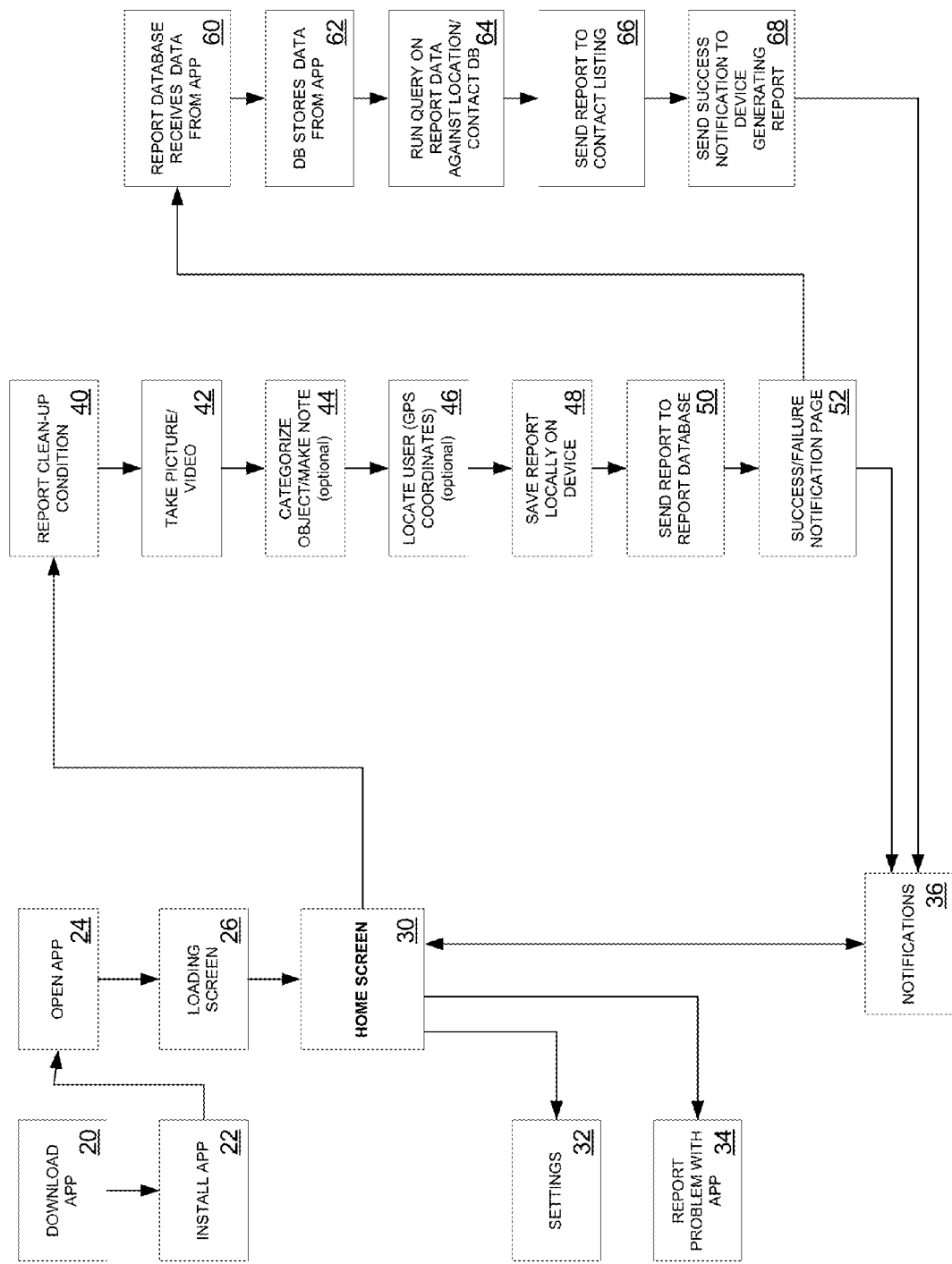
FIG. 3 shows a chart of process flow for an embodiment of the present invention.

As seen in FIGS. 2 and 3, in an exemplary embodiment the invention comprises a system and apparatus for receiving waste or condition metadata information to be associated with a geographic location. The information may be real-time reports (Step 1), and include a photo of the waste or condition (as seen in FIG. 1), the GPS coordinates of the photo of the waste or condition, a timestamp, and information related to the identity of the reporting user or observer. This information is sent to and stored in a database in association with the location, and in association with the user (Step 2).

The report or reports may be analyzed by image optimization and image recognition software algorithms. Imagery analysis allows automatic recognition of objects as known or unknown to the database, followed by known categories being recognized. Synchronous imagery analysis results in robust real-time mapping of trash or conditions (removal chain). This allows tracing of waste or conditions based on origin. Understanding the provenance of waste or conditions may allow for legal tracing of liability, enforcement of which could constitute an additional source of income.

The system may be used for reporting the need for trash removal. Monitoring fair and accurate charges for trash removal on the basis of trash volume versus regularity of pickups allows for significant cost savings to consumers and potential incentive to reduce the environmental footprint. The cost savings (and corollary cost increase for higher number of responses) is an incentive to not report false positive waste reports.

The report data is sent to the appropriate entity responsible for the waste removal ("responder") (Step 3). Responders include private landowners, commercial landowners or business (e.g., malls, factories), governmental agencies or entities, hospitals, waste management companies, educational institutions, and the like. Real time report data and transmission to responders eliminates or reduce trash overages, under size containers, and poor container maintenance conditions (e.g., no lid). Permits/citations/fees/sanctions will force compliance. Users can specify correct container size, and schedule additional pick-ups. Service may be halted due to lack of payment or by schedule.

Information regarding each user, the account associated therewith, and the responder in a reporting user's given roaming location (anywhere globally) is stored on a managed database. The database may include other information such as responder or hauler name, unique identifier number, expiration date (a date beyond which responder may not be able to respond), and so forth.

Understanding the nature, origin, and dynamics of waste diffusion from particular sources (i.e., consumer goods manufacturers selling goods in non-compostable packaging) can be financially significant. Empirically robust market data on the environmental impact of their consumer goods (e.g., Pepsi bottles; Starbucks cups) can be sold to businesses. Visualization on a real-time global scale also opens new forms of consumer advocacy. The integration of social media processes allows for game-ification (e.g., points for submitting litter reports, points for cleanup), and financial incentivization (e.g., coupons for Pepsi for ten reports of Pepsi bottles). Tracing of user reports back to the user's mobile device radically decreases likelihood of false reports, as the reporting user's "credibility" ranking can also be lowered or otherwise adjusted based on the accuracy and quality of reports.

The system also allows the building of superior datasets. Superior datasets are valuable to all landowners, and are ultimately valuable to consumers. Ranking countries, states, cities, neighborhoods, businesses, and campuses (public and private) by effectiveness of clean-ups and conditions (and, by implication, cleanliness/desirability of neighborhood or property) can be a significant source of revenue for a ratings agency or the landowner.

In yet another embodiment, the system may be used by property owners or operators to maintain clean and safe environments and locations. From the standpoint of competitive advantage as well as the reduction of liability, commercial, industrial and large residential (e.g., condos and apartment buildings) property owners desire to offer their customers and employees a clean and safe environment. Such businesses or owners can subscribe to receive real-time waste reports to ensure near-real-time responsiveness to waste or condition issues in a given area or microjurisdiction (i.e., spilled milk in grocery store; soggy stair at a mall).

In a further embodiment, the invention comprises the transmission of data to parties responsible for waste removal in a given jurisdiction or condition rectification (e.g., a property owner or operator) in real-time. Thus, for example, a business owner who subscribes to the service can be notified of a dangerous condition, such as a liquid spill, immediately following submission of report by a customer observing and reporting the condition. Or the existence of waste or refuse can be reported to the appropriate municipal waste management companies, private waste removal companies, individual responders, or operators of waste and refuse removing and hauling vehicles (i.e., vehicles having an on-board communication system for controlling, tracking, and monitoring movement of a waste or refuse receptacle relative to the vehicle). Waste haulers specializing in recyclable materials may subscribe to real-time report databases of valuable units of recyclable material, or accumulated volume triggered reports. Subscription access to a real-time robust, ongoing global database of litter reports represents a source of income.

An embodiment of the present invention comprises many user-generated map layers, including responding party information in a particular municipality or location. Partial population of the data fields and continued integrity of the datasets from user input in native languages represents a robust global database of municipal-citizen (university-student; company-employee) civic interactions. This may include frequency of reports in a given jurisdiction, responsiveness of a particular responding agency (or firm) within that jurisdiction, and access to datasets containing contact information for responding agencies (i.e., for marketing purposes). Beyond litter reports, responsiveness to citizen complaints/reports can be correlated to a responder's general measure of good/bad will or resource allocation for civic maintenance. Restricted access to user rates, user identification/demographic information, and other metrics/indicia of user activity within a given jurisdiction on an exceptional fee or subscription basis can be an additional source of revenue generation.

In yet another embodiment, the system can be used for recyclable content. Each moment, citizens dispose of millions of tons of valuable recyclable post-consumer content. In instances, this may include precious metals (such as the disposal of batteries, electronics, and other materials). An embodiment of the present invention provides a method and system for managing data relating to recyclable materials by providing a database system comprising an input for receiving information from reporters, said information comprising sets of source identifications (analyzed photo of waste item) and associated recycled quantities. A related embodiment of the present invention includes a transmission algorithm allowing tracing of reports from the database to likely buyers of "recyclable waste" reports (i.e., firms that specialize in lead acid battery removal; metals).

The database system can produce such information as:

i. a geographic analysis module for analyzing geographic recycling patterns of respective households, neighborhoods, parks, corporate or educational campuses, city/county/state governments, federal governments, nation-state;

ii. a historical analysis module for analyzing temporal trends of recycling for one or more respective households, neighborhoods, parks, corporate or educational campuses, city/county/state governments, federal governments, nation-state;

iii. a route analysis module for analyzing recycling statistics for a recycling pickup vehicle based on responsiveness to incident reports;

iv. a route optimization module for predicting an optimal recycling or waste removal pickup vehicle route;

v. a compliance determination module for determining a statistical likelihood of respective households, neighborhoods, parks, corporate or educational campuses, city/ county/state governments, federal governments, nation-state compliance with recycling or litter reduction requirements; and vi. an incentive response module for determining a responsiveness of respective households, neighborhoods, parks, corporate or educational campuses, city/county/state governments, federal governments, nation-states to recycling incentives.

FIG. 3 shows a diagram of the steps for downloading and using an application of the present invention. The user downloads 20 and installs 22 the application onto his or her computing device (e.g., tablet, smart phone, and the like). When the user sees a reportable condition, the user opens the application 24, whereupon the application present a loading screen 26 before presenting a home screen 30. From the home screen, the user is presented with a menu of options. The user can set or adjust application settings 32, report a problem with the application 34, and manage notifications 36, as well as report a condition that needs cleaning-up or repair 40. When the user selects the latter option, they are prompted by the application to take a picture or video 42 of the condition, optionally categorize the object or condition or add a note 44, add a GPS or location tag or coordinates 46 (the application can use the GPS information from the computing device, or prompt the user to enter location data, such as a street address), and then save the report 48. The report is then sent via wireless network to the report database 50 (this can be done automatically once the report is saved, or at the prompting or confirmation of the user). The application then present a notification success or failure page 52 to the user based upon whether the report was successfully received by the report database 60.

Upon receipt of the report 60, the system's report database stores the data from application's report 62 and the system runs a query on the report data against the location/contact database to determine contact information based upon the location data 64. The system the sends a report to the listed contact 66. Upon successful sending of the report to the listed contact, the system sends a success notification 68 to the application to inform the user that the report has been successfully received and forwarded to the appropriate person or entity.

In order to provide a context for the various aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), network PCs, minicomputers, mainframe computers, embedded systems, distributed computing environments, and the like.

Embodiments of the invention may be implemented in the form of computer-executable instructions, such as program code or program modules, being executed by a computer or computing device. Program code or modules may include programs, objections, components, data elements and structures, routines, subroutines, functions and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices.

In one embodiment, a computer system comprises multiple client devices in communication with at least one server device through or over a network. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like) or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. Even though specific embodiments of this invention have been described, they are not to be taken as exhaustive. There are several variations that will be apparent to those skilled in the art.

An exemplary claim is a system and method for generating income from user-generated waste reports, comprising the following: (1) users generate waste reports on a daily basis, across a wide range of geographic settings; (2) waste reports are generated and maintained in a robust global database of user-generated trash reports; (3) waste reports are tagged by geo-location, time, and user parameters; (4) charging a municipality or private landowner a fee when a municipality or landowner desires to access the waste report(s) database entry.

What is claimed is:

1. A method, comprising:
providing an application for downloading and installation on a portable computing device of a reporting user, wherein said application in operation prompts the reporting user to submit a report of a reportable condition with image data and location data, wherein said reportable condition comprises the presence of one or more of recyclable materials, removable objects, or hazardous materials;
receiving, at a computer server with a processor or microprocessor coupled to a memory, a plurality of reports from a plurality of reporting users of a plurality of reportable conditions;
sending, from the computer server, a receipt notification to the application of each of said plurality of users upon the successful receipt of the corresponding report from each of said plurality of users;
analyzing the image data in each of said plurality of reports to identify any objects, materials, or types of recyclable materials present:
storing said plurality of reports, and image analysis data in a database in electronic communication with said computer server;
receiving, at said computer server, a request from a recycling user for a listing of all reports in said database for one or more specified types of recyclable material within a designated area;
generating, using said processor or microprocessor, a listing of all reports in said database wherein the reported condition includes said one or more specified types of recyclable material:
determining an optimal route for a recycling vehicle to pick up the recyclable material in said listing;
transmitting the listing and the optimal route determination to the recycling user;
determining, using said processor or microprocessor, for each report received whether said reportable condition requires existence notification of a designated contact; and
if said reportable condition is a condition requiring existence notification, determining information for a designated contact for said report based upon the reported location data, and sending an existence notification of the reportable condition to said designated contact.

2. The method of claim 1, wherein the step of sending an existence notification of the reportable condition to said designated contact comprises sending at least one copy of the report to said designated contact.

3. The method of claim 1, wherein the location data comprises three-dimensional coordinates automatically obtained from a global positioning device or chip in the portable computing device.

4. The method of claim 1, wherein the report comprises a picture or video of said reportable condition.

5. The method of claim 1, wherein the report comprises a user comment or note.

6. The method of claim 1, wherein the report comprises a category for said reportable condition.

7. The method of claim 1, further comprising the step of, if a particular reportable condition is a condition requiring existence notification, sending a confirmation notification to the application of each user who sent a report for that particular condition upon the successful sending of the notification of the reportable condition to said designated contact.

8. The method of claim 1, wherein the report comprises an estimated quantity of recyclable material.

9. The method of claim 1, further comprising the step of:
analyzing, using a processor or microprocessor, the reports in the database.

10. The method of claim 9, wherein the analysis determines one or more of recycling patterns in a particular area or areas, and concentrations of particular materials in a particular area or areas.

11. The method of claim 9, wherein the analysis determines compliance with recycling regulations or requirements in a particular area or areas.

12. The method of claim 1, further comprising the step of:
providing datasets to third parties based on report information in the database.

13. The method of claim 12, wherein the datasets comprise user-generated map layers, data analysis results, or combinations thereof.

14. The method of claim 1, wherein the portable computing device is a tablet computer, cell phone, or smart phone.

15. The method of claim 1, further comprising the steps of:
providing points to a reporting user for reporting certain types of reportable conditions; and
providing a financial award to a reporting user upon reaching a pre-determined number of points.

16. The method of claim 1, further comprising the steps of:
calculating an credibility rating for each reporting user based upon the accuracy and quality of reports.

17. The method of claim 16, wherein the credibility rating for a particular reporting user is continuously adjusted based upon each the accuracy and quality of each report received from that particular reporting user.

* * * * *